(12) United States Patent
Lee et al.

(10) Patent No.: US 10,684,711 B2
(45) Date of Patent: Jun. 16, 2020

(54) SUBPIXEL STRUCTURE OF DISPLAY DEVICE AND TOUCH SCREEN-INTEGRATED DISPLAY DEVICE HAVING THE SAME

(71) Applicant: LG Display Co., Ltd., Seoul (KR)

(72) Inventors: Tae Keun Lee, Chilgok-gun (KR); Soo Young Choi, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 530 days.

(21) Appl. No.: 15/364,102

(22) Filed: Nov. 29, 2016

(65) Prior Publication Data
US 2017/0153735 A1 Jun. 1, 2017

(30) Foreign Application Priority Data
Nov. 30, 2015 (KR) ........................ 10-2015-0169459

(51) Int. Cl.
*G06F 3/041* (2006.01)
*G02F 1/1333* (2006.01)
(Continued)

(52) U.S. Cl.
CPC .......... *G06F 3/0412* (2013.01); *G02F 1/1368* (2013.01); *G02F 1/13338* (2013.01); *G02F 1/13439* (2013.01); *G02F 1/133512* (2013.01); *G02F 1/134336* (2013.01); *G02F 1/136227* (2013.01); *G02F 1/136286* (2013.01); *G06F 3/044* (2013.01); *G06F 3/047* (2013.01); *G09G 3/3677* (2013.01); *G09G 3/3688* (2013.01);
(Continued)

(58) Field of Classification Search
CPC ............... G06F 3/0412; G02F 1/13338; G02F 1/133512; G02F 1/134336; G02F 1/13439; G02F 1/136227; G02F 1/136286; G02F 1/1368; G02F 1/044; G02F 1/047; G09G 3/3677; G09G 3/3688
See application file for complete search history.

(56) References Cited

U.S. PATENT DOCUMENTS 5,977,562 A * 11/1999 Hirakata ........... G02F 1/134363
257/72
7,602,358 B2 * 10/2009 Tsubata ............. G02F 1/136209
345/87
(Continued)

FOREIGN PATENT DOCUMENTS

| CN | 103364983 A | 10/2013 |
|---|---|---|
| CN | 203941365 U | 11/2014 |

(Continued)

*Primary Examiner* — Sejoon Ahn
(74) *Attorney, Agent, or Firm* — Seed IP Law Group LLP

(57) ABSTRACT

There are provided a subpixel structure of a display device and a touch screen-integrated display device, including: a plurality of gate lines; a plurality of data lines configured to define subpixels by intersecting with the gate lines; a thin-film transistor; a pixel electrode disposed in the subpixel area; and a common electrode disposed to be overlapped with the pixel electrode with a protective layer interposed therebetween. The pixel electrode has patterns including a plurality of pixel electrode spaces in an area corresponding to the thin-film transistor so as to suppress a white touch mura defect and also suppress a decrease in transmittance occurring at an interface between an open area and a BM area.

21 Claims, 12 Drawing Sheets

(51) Int. Cl.
*G02F 1/1335* (2006.01)
*G02F 1/1343* (2006.01)
*G02F 1/1362* (2006.01)
*G02F 1/1368* (2006.01)
*G06F 3/044* (2006.01)
*G06F 3/047* (2006.01)
*G09G 3/36* (2006.01)

(52) U.S. Cl.
CPC ............... *G02F 1/134363* (2013.01); *G02F 2001/134345* (2013.01); *G02F 2201/121* (2013.01); *G02F 2201/122* (2013.01); *G02F 2201/123* (2013.01); *G06F 3/0416* (2013.01); *G06F 2203/04111* (2013.01); *G09G 2300/0439* (2013.01); *G09G 2300/0809* (2013.01)

(56) References Cited

U.S. PATENT DOCUMENTS

| | | | | |
|---|---|---|---|---|
| 9,429,797 | B2* | 8/2016 | Chai | G02F 1/133345 |
| 9,791,735 | B2* | 10/2017 | Ma | G02F 1/133603 |
| 10,094,962 | B2* | 10/2018 | Liu | G02F 1/133533 |
| 10,126,606 | B2* | 11/2018 | Park | G02F 1/134309 |
| 2005/0122445 | A1* | 6/2005 | Park | G02F 1/133514 |
| | | | | 349/106 |
| 2006/0139543 | A1* | 6/2006 | Kim | G02F 1/134363 |
| | | | | 349/141 |
| 2007/0024786 | A1* | 2/2007 | Tanaka | G02F 1/133707 |
| | | | | 349/139 |
| 2008/0198439 | A1* | 8/2008 | Cho | B82Y 20/00 |
| | | | | 359/280 |
| 2008/0198441 | A1* | 8/2008 | Cho | G02F 1/091 |
| | | | | 359/281 |
| 2008/0199667 | A1* | 8/2008 | Cho | G02F 1/091 |
| | | | | 428/212 |
| 2008/0246906 | A1* | 10/2008 | Kim | G02F 1/13394 |
| | | | | 349/106 |
| 2010/0194698 | A1* | 8/2010 | Hotelling | G06F 3/3218 |
| | | | | 345/173 |
| 2011/0058128 | A1* | 3/2011 | Adachi | G02F 1/133528 |
| | | | | 349/96 |
| 2011/0096282 | A1* | 4/2011 | Cho | G02F 1/133707 |
| | | | | 349/144 |
| 2011/0317104 | A1* | 12/2011 | Nakamura | G02F 1/133371 |
| | | | | 349/106 |
| 2013/0057820 | A1* | 3/2013 | Hyodo | G02F 1/1337 |
| | | | | 349/155 |
| 2013/0257794 | A1 | 10/2013 | Lee et al. | |
| 2016/0041664 | A1* | 2/2016 | Qin | G06F 3/044 |
| | | | | 345/173 |
| 2016/0252793 | A1 | 9/2016 | Cheng et al. | |
| 2017/0052402 | A1* | 2/2017 | Yamagata | G02F 1/1368 |

FOREIGN PATENT DOCUMENTS

| | | |
|---|---|---|
| CN | 105093736 A | 11/2015 |
| TW | 201314328 A1 | 4/2013 |

\* cited by examiner

SUBPIXEL STRUCTURE OF DISPLAY DEVICE AND TOUCH SCREEN-INTEGRATED DISPLAY DEVICE HAVING THE SAME

CROSS-REFERENCE TO RELATED APPLICATIONS

This application claims priority from Korean Patent Application No. 10-2015-0169459, filed on Nov. 30, 2015, which is hereby incorporated by reference for all purposes as if fully set forth herein.

BACKGROUND OF THE INVENTION

Field of the Invention

The present invention relates to a subpixel structure of a display device and a touch screen-integrated display device having the same.

Description of the Related Art

With progress of the information-oriented society, various types of demands for display devices for displaying an image are increasing. Recently, various types of display devices such as a liquid crystal display (LCD) device, a plasma display panel (PDP) device, or an organic light emitting display (OLED) device have been used.

Such display devices are breaking away from conventional input systems, such as a button, a keyboard and a mouse, and providing a touch-based input system which allows a user to intuitively and conveniently input information or instructions.

In order to provide the touch-based input system, it is required to identify a touch or non-touch of a user and exactly detect touch coordinates.

To this end, according to the related art, one of various touch modes such as a resistance film mode, a capacitance mode, an electromagnetic induction mode, an infrared mode, and an ultrasonic mode is adopted to provide touch sensing.

Further, regarding application of a touch screen to a display device, a technology of installing a touch sensor within a display device has been developed. In particular, an in-cell type display device using a common electrode formed on a lower substrate as a touch electrode has been developed.

However, such an in-cell type display device or an in-plane switching (IPS) mode liquid crystal display device is vulnerable to white touch mura observed when a common electrode (or touch electrode) is located on a pixel electrode and the alignment of liquid crystals is changed by an external pressure such as a touch but cannot be rapidly restored.

In order to improve such a white touch mura, various technologies have been suggested. However, even if a touch mura is improved, other additional image quality defects such as a decrease in brightness of each subpixel may occur.

SUMMARY OF THE INVENTION

An aspect of the present invention provides a subpixel structure of a display device in which patterns (concavo-convex patterns) having a plurality of pixel electrode spaces are formed on a pixel electrode area disposed in a subpixel so as to suppress a white touch mura defect and also suppress a decrease in transmittance occurring at an interface between an open area and a BM area, and also provides a touch screen-integrated display device having the subpixel structure.

According to an aspect of the present invention, there is provided a subpixel structure of a display device, including: a plurality of gate lines disposed in a first direction; a plurality of data lines disposed in a second direction and configured to define subpixels by intersecting with the gate lines; a thin-film transistor disposed at an intersection of the gate line and the data line; a pixel electrode disposed in the subpixel area; and a common electrode disposed to be overlapped with the pixel electrode with a protective layer interposed therebetween. Herein, the common electrode has a slit structure including a plurality of common electrode spaces, and the pixel electrode has patterns including a plurality of pixel electrode spaces in an area corresponding to the thin-film transistor. Thus, the subpixel structure has an effect of suppressing a white touch mura defect and also suppressing a decrease in transmittance occurring at an interface between an open area and a BM area.

Further, according to another aspect of the present invention, there is provided a touch screen-integrated display device including: a plurality of gate lines disposed in a first direction; a plurality of data lines disposed in a second direction and configured to define subpixels by intersecting with the gate lines; a thin-film transistor disposed at an intersection of the gate line and the data line; a pixel electrode disposed on the thin-film transistor with a flattening layer interposed therebetween in each subpixel area; and a plurality of touch electrodes disposed in the form of block on each pixel electrode with a protective layer interposed therebetween in each group of a plurality of subpixels. The touch electrode has a slit pattern structure including a plurality of common electrode spaces in an area corresponding to each subpixel, and the pixel electrode has patterns including a plurality of pixel electrode spaces in an area corresponding to the thin-film transistor. Thus, the touch screen-integrated display device has an effect of suppressing a white touch mura defect and also suppressing a decrease in transmittance occurring at an interface between an open area and a BM area.

In a subpixel structure of a display device and a touch screen-integrated display device having the subpixel structure according to one embodiment of the present invention, patterns (concavo-convex patterns) having a plurality of pixel electrode spaces are formed on a pixel electrode area disposed in a subpixel so as to suppress a white touch mura defect and also suppress a decrease in transmittance occurring at an interface between an open area and a BM area.

BRIEF DESCRIPTION OF THE DRAWINGS

The above and other aspects, features and other advantages of one embodiment of the present invention will be more clearly understood from the following detailed description taken in conjunction with the accompanying drawings, in which.

DETAILED DESCRIPTION OF THE EMBODIMENT

Figure 1:
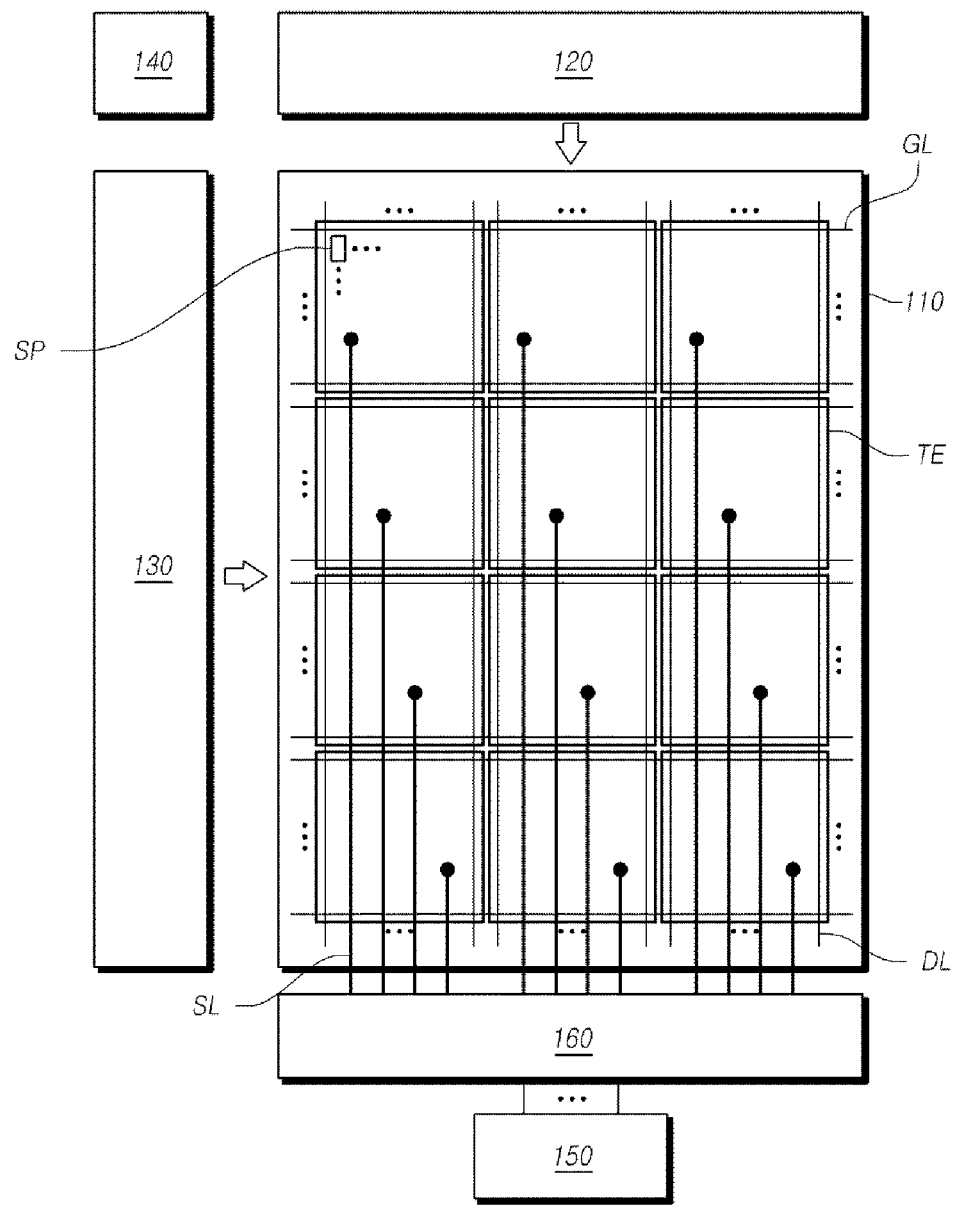
FIG. 1 is a configuration view of a touch screen-integrated display device according to one embodiment of the present invention.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the invention, and the present disclosure will be defined by the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description, a detailed explanation of well-known related technologies may be omitted to avoid unnecessarily obscuring the subject matter of the present disclosure.

The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", "next" and the like, one or more parts may be positioned between the two parts unless the terms are used with the term "immediately" or "directly".

When the time sequence between two or more incidents is described using the terms such as "after", "subsequent to", "next to", and "before", two or more incidents may be inconsecutive unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present disclosure.

The features of various exemplary embodiments of the present disclosure can be partially or entirely bonded to or combined with each other and can be interlocked and operated in technically various ways as can be fully understood by a person having ordinary skill in the art, and the various exemplary embodiments can be carried out independently of or in association with each other.

Hereinafter, exemplary embodiments of the present disclosure will be described in detail with reference to the accompanying drawings. Also, the size and thickness of the device might be expressed to be exaggerated for the sake of convenience in the drawings. Like reference numerals generally denote like elements throughout the present specification.

FIG. 1 is a configuration view of a touch screen-integrated display device 100 according to the "present invention".

Referring to FIG. 1, the touch screen-integrated display device 100 according to the "present invention" is a display device capable of providing an image display function (display function) and a touch sensing function.

The touch screen-integrated display device 100 according to one embodiment of the present invention may be, for example, a medium and large device, such as a TV or a monitor, or a mobile device, such as a smartphone or a tablet PC, having a touch sensing function in response to a touch input.

Referring to FIG. 1, the touch screen-integrated display device 100 according to one embodiment of the present invention includes a display panel 110, a data driver 120, a gate driver 130 and a controller 140 in order to provide the display function.

The display panel 110 may include a plurality of data lines DL disposed in a first direction (for example, in a column direction) and a plurality of gate lines GL disposed in a second direction (for example, in a row direction).

The data driver 120 drives the plurality of data lines DL. Herein, the data driver 120 may also be referred to as "source driver".

The gate driver 130 drives the plurality of gate lines GL. Herein, the gate driver 130 may also be referred to as "scan driver".

The controller 140 controls the data driver 120 and the gate driver 130. In order to do so, the controller 140 supplies various control signals to the data driver 120 and the gate driver 130.

The controller 140 starts a scan according to timing implemented in each frame, converts image data input from the outside to be suitable for a data signal form used by the data driver 120, outputs the converted image data, and controls a driving of data at a proper time corresponding to the scan.

The controller 140 may be a timing controller used in a general display technology or a controller including the timing controller and performing additional control functions.

The gate driver 130 sequentially supplies an ON voltage or OFF voltage scan signal to the plurality of gate lines according to the control of the controller 140.

If a specific gate line is opened by the gate driver 130, the data driver 120 converts the image data received from the controller 140 into a data voltage of an analog form and supplies the data voltage to the plurality of data lines DL.

The data driver 120 is located at only one side (for example, upper side or lower side) of the display panel 110 in FIG. 1, but may be located at both sides (for example, upper side and lower side) of the display panel 110 depending on the driving method or the design method of the panel.

The gate driver 130 is located at only one side (for example, left side or right side) of the display panel 110 in FIG. 1, but may be located at both sides (for example, left side and right side) of the display panel 110 depending on the driving method or the design method of the panel.

The aforementioned controller 140 receives input image data together with various timing signals, such as a vertical synchronization signal Vsync, a horizontal synchronization signal Hsync, an input data enable (DE) signal, and a clock signal CLK from the outside (for example, a host system).

The touch screen-integrated display device 100 according to one embodiment of the present invention" may be any one of various devices such as a liquid crystal display device, an organic light emitting display device, and a plasma display device. For example, the touch screen-integrated display device 100 may be an in-plane switching (IPS) mode liquid crystal display device in which liquid crystal molecules are aligned horizontally and rotated in place to display an image and which has advantages of high resolution, low power consumption, wide viewing angle, and the like. More specifically, the touch screen-integrated display device 100 may be an advanced high performance-IPS (AH-IPS) mode liquid crystal display device.

Each subpixel SP disposed in the display panel 110 may be configured to include circuit elements such as a transistor.

Meanwhile, the touch screen-integrated display device 100 according to the one embodiment of present invention may include a touch system in order to provide the touch sensing function.

Referring to FIG. 1, the touch system may include a plurality of touch electrodes TE functioning as touch sensors and a touch circuit 150 configured to sense a touch by driving the plurality of touch electrodes TE.

The touch circuit 150 sequentially supplies a touch drive signal to the plurality of touch electrodes TE to sequentially drive the plurality of touch electrodes TE.

Then, the touch circuit 150 receives a touch sensing signal from a touch electrode to which the touch drive signal is applied.

The touch circuit 150 may identify a touch or non-touch and calculate touch coordinates on the basis of touch sensing signals received from the plurality of touch electrodes TE.

Herein, the touch drive signal may have, for example, a waveform of a pulse-modulated signal having two or more voltage levels.

The touch sensing signals received from the plurality of touch electrodes TE may vary depending on whether or not a touch is input by a pointer such as a finger or a pen around the corresponding touch electrodes.

The touch circuit 150 may identify a touch or non-touch and obtain touch coordinates by obtaining a capacitance variation (or voltage variation or charge variation) in the touch electrodes TE on the basis of the touch sensing signals.

Referring to FIG. 1, each of the touch electrodes TE is connected to a sensing line SL in order to supply a touch drive signal to each of the plurality of touch electrodes TE.

Further, in order to sequentially supply a touch drive signal to the plurality of touch electrodes TE, the touch system may further include a switch circuit 160 configured to sequentially connect the touch circuit 150 to the sensing lines SL respectively connected to the plurality of touch electrodes TE.

The switch circuit 160 may include at least one multiplexer.

Meanwhile, referring to FIG. 1, each of the plurality of touch electrodes TE may be formed into a block shape.

Further, each touch electrode TE may have a size equal or corresponding to a size of one subpixel area SP.

Otherwise, each touch electrode TE may have a size greater than a size of one subpixel area SP as illustrated in FIG. 1.

That is, each touch electrode TE area may have a size corresponding to a size of two or more subpixel areas SP.

Meanwhile, referring to FIG. 1, the plurality of touch electrodes TE may be built in the display panel 110.

In this sense, it can be said that the display panel 110 may be integrated with a touch screen or a touch screen panel. That is, the display panel 110 may be an in-cell or on-cell touch screen-integrated display panel.

Meanwhile, the touch screen-integrated display device 100 according to one embodiment of the present invention may operate in a display mode in order to provide the display function, or may operate in a touch mode in order to provide the touch sensing function.

In this regard, the plurality of touch electrodes TE may operate as touch sensors during the touch mode, and may be used as display mode electrodes during the display mode.

For example, during the display mode, the plurality of touch electrodes TE may operate as common electrodes to which a common voltage Vcom is applied, as an example of a display mode electrode.

Herein, the common voltage Vcom corresponds to a pixel voltage to be applied to a pixel electrode.

Meanwhile, the plurality of touch electrodes TE built in the display panel 110 may be disposed in a matrix of N (N≥2) number of rows and M (M≥2) number of columns, as illustrated in FIG. 1.

Figure 2:
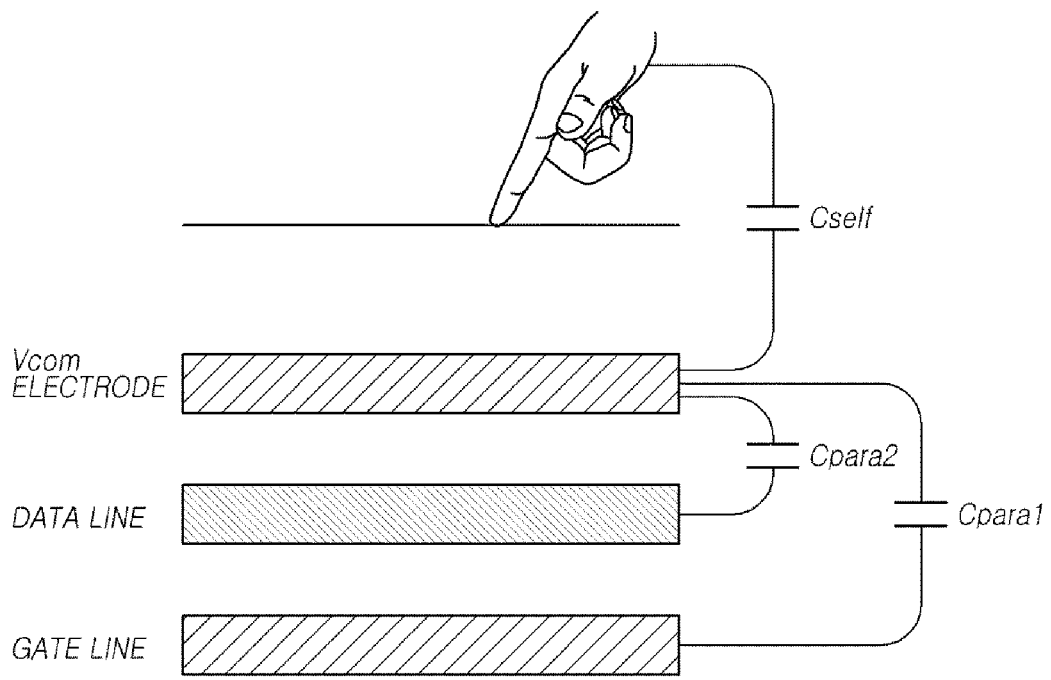
FIG. 2 is a diagram illustrating capacitance components (Cself, Cpara1 and Cpara2) generated during a touch mode in a touch screen-integrated display device according to one embodiment of the present invention.

FIG. 2 is a diagram illustrating capacitance components (Cself, Cpara1 and Cpara2) generated during a touch mode in the touch screen-integrated display device 100 according to one embodiment of the present invention.

Referring to FIG. 2, the plurality of touch electrodes TE, which functions as the touch electrodes in the touch mode and the common electrodes (Vcom electrodes) which form liquid crystal capacitors together with the pixel electrodes in the display mode, generates a self-capacitance Cself together with a pointer such as a finger or a pen in order to detect a touch or non-touch and the coordinates of the touch in the touch mode.

Meanwhile, the plurality of touch electrodes TE functioning as the common electrodes may also generate parasitic capacitances Cpara1 and Cpara2 together with a gate line GL and a data line DL. However, the parasitic capacitances Cpara1 and Cpara2 are negligible since they are very smaller than the self-capacitance.

Hereinafter, the display panel 110 of the touch screen-integrated display device 100 according to an exemplary embodiment of one embodiment of the present invention, a method of applying the common voltage and the touch drive signal to the plurality of touch electrodes TE11 to TE14, TE21 to TE24, and TE31 to TE34 which functions as both the common electrodes and the touch electrodes, a method of applying the data voltage and the touch drive signal (or the signal corresponding to the touch drive signal) to the data lines DL, a method of applying the data voltage and the touch drive signal (or the signal corresponding to the touch drive signal) to the gate lines GL, and the like, will be described in more detail.

Figure 3:
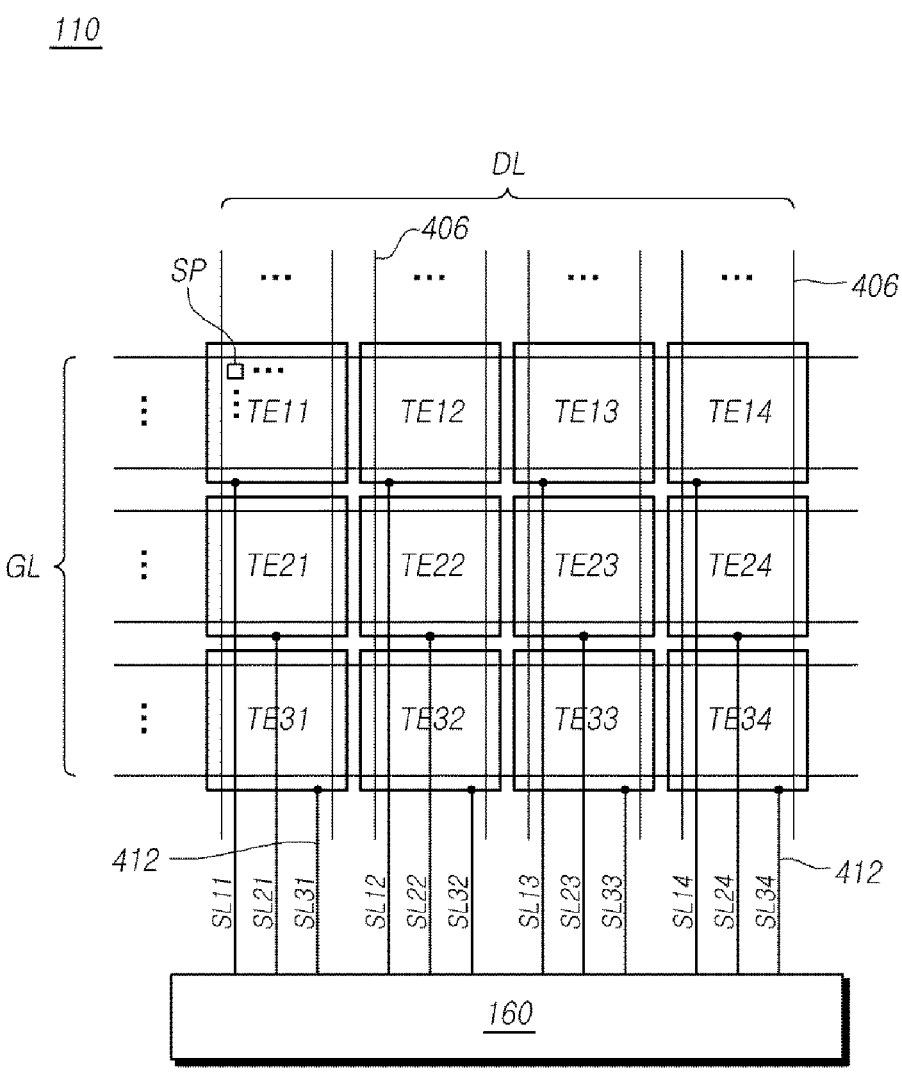
FIG. 3 is a plane view illustrating a display panel of the touch screen-integrated display device according to one embodiment of the present invention.

FIG. 3 is a plane view illustrating a display panel of the touch screen-integrated display device according to the present invention.

Figure 4:
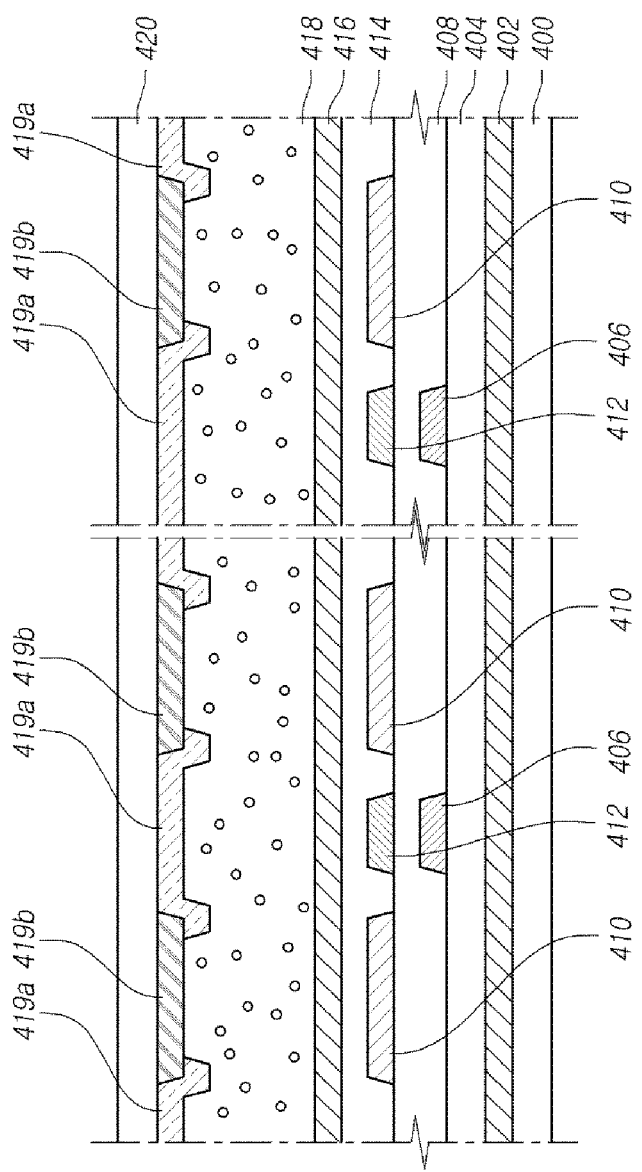
FIG. 4 is a diagram illustrating a cross-section of a display panel in a case where a touch screen-integrated display device according to an exemplary embodiment of the present invention is a liquid crystal display device.

Referring to FIG. 3, as described above, the display panel 110 includes the plurality of data lines DL, as labeled 406 as shown in FIG. 4, the plurality of gate lines GL, and the plurality of touch electrodes TE11 to TE14, TE21 to TE24, and TE31 to TE34, as labeled 416 as shown in FIG. 4.

In addition, the display panel 110 can operate in the display mode or the touch mode, as described above.

In this regard, the plurality of data lines DL and the plurality of gate lines GL formed on the display panel 110 are components with which the display panel 110 can function as a display panel.

Further, the plurality of touch electrodes TE11 to TE14, TE21 to TE24, and TE31 to TE34 formed on the display panel 110 is a component with which the display panel 110 can function as both a display panel and a touch screen panel.

More specifically, when the display panel 110 functions as a display panel, i.e. when a driving mode of the display panel 110 is the display mode, the plurality of touch electrodes TE11 to TE14, TE21 to TE24, and TE31 to TE34 functions as the "common electrodes" (also referred to as the "Vcom electrodes") to which the common voltage Vcom is applied and which are disposed to face a pixel electrode (first electrode, not illustrated).

Further, when the display panel 110 functions as a touch screen panel, i.e. when a driving mode of the display panel 110 is the touch mode, the plurality of touch electrodes TE11 to TE14, TE21 to TE24, and TE31 to TE34 forms capacitors together with the touch pointer (for example, a finger or a pen) in response to a touch drive voltage applied thereto, and functions as the "touch electrodes" which measure a capacitance of the capacitors.

In other words, the plurality of touch electrodes TE11 to TE14, TE21 to TE24, and TE31 to TE34 functions as the common electrodes (Vcom electrodes) in the display mode and the touch electrodes in the touch mode.

The plurality of touch electrodes TE11 to TE14, TE21 to TE24, and TE31 to TE34 is applied with the common voltage Vcom in the display mode and the touch drive signal in the touch mode.

Therefore, as illustrated in FIG. 3, sensing lines SL11 to SL14, SL21 to SL24 and SL31 to SL34, each labeled as line 412 (see FIG. 4) can be connected to the plurality of touch electrodes TE11 to TE14, TE21 to TE24, and TE31 to TE34 in order to transfer the common voltage or the touch drive signal to the plurality of touch electrodes TE11 to TE14, TE21 to TE24, and TE31 to TE34.

Accordingly, in the touch mode, a touch drive signal Vtd generated from the touch circuit 150 and the switch circuit 160 is applied to all or parts of the plurality of touch electrodes TE11 to TE14, TE21 to TE24, and TE31 to TE34 through the sensing lines SL11 to SL14, SL21 to SL24 and SL31 to SL34. In the display mode, a common voltage Vcom supplied from a common voltage supply unit (not illustrated) is applied to the plurality of touch electrodes TE11 to TE14, TE21 to TE24, and TE31 to TE34 through the sensing lines SL11 to SL14, SL21 to SL24 and SL31 to SL34.

Referring to FIG. 3, subpixels SP are defined respectively corresponding to points where the plurality of data lines DL and the plurality of gate lines GL formed on the display panel 110 intersect with each other. Herein, each subpixel may be one of a red (R) subpixel, a green (G) subpixel, a blue (B) subpixel, and a white (W) subpixel.

Referring to FIG. 3, two or more subpixels SP may be defined in an area (hereinafter, also referred to as a unit touch electrode area) where each of the plurality of touch electrodes TE11 to TE14, TE21 to TE24, and TE31 to TE34 functioning as the common electrodes and the touch electrodes is formed. That is, one of the plurality of touch electrodes TE11 to TE14, TE21 to TE24, and TE31 to TE34 corresponds to two or more subpixels SP.

For example, a 24*3 number of data lines DL and 24 gate lines GL may be disposed in one area (unit touch electrode area) where each of the plurality of touch electrodes TE11 to TE14, TE21 to TE24, and TE31 to TE34 functioning as the common electrodes and the touch electrodes is formed, thereby defining a 24*3*24 number of subpixels SP.

Meanwhile, each of the plurality of touch electrodes TE11 to TE14, TE21 to TE24, and TE31 to TE34 functioning as the common electrodes and the touch electrodes may be a block-shaped pattern, as illustrated in FIG. 3, or in some cases, a pattern including a comb teeth pattern in an area corresponding to each subpixel SP.

The present invention can be applied to a case where each of the plurality of touch electrodes TE11 to TE14, TE21 to TE24, and TE31 to TE34 functioning as the common electrodes and the touch electrodes is the pattern including a comb teeth pattern.

FIG. 4 is a diagram illustrating a cross-section of a display panel in a case where the touch screen-integrated display device 100 according to an exemplary embodiment of the present invention is a liquid crystal display device.

FIG. 4 is a cross-sectional view illustrating an area (unit touch electrode area) where one of the plurality of touch electrodes TE11 to TE14, TE21 to TE24, and TE31 to TE34 functioning as the common electrodes and the touch electrodes is formed.

Referring to FIG. 4, in the display panel 110 of the touch screen-integrated display device 100, for example, a gate line 402 is formed in a first direction (in a horizontal direction, which is in the right and left direction in FIG. 3) on a lower substrate 400, and a gate insulation layer (gate insulator) 404 is formed thereon.

A data line 406 is formed in a second direction (in a vertical direction, which is in the direction perpendicular to the paper surface in FIG. 3) on the gate insulation layer 404, and a first protective layer 408 is formed thereon.

Pixel electrodes 410 of each subpixel area and sensing lines 412 are formed on the first protective layer 408, and a second protective layer 414 may be formed thereon. Herein, the sensing lines 412 are respectively connected from the plurality of touch electrodes TE11 to TE14, TE21 to TE24, and TE31 to TE34 functioning as the common electrodes and the touch electrodes to the switch circuit 160 to transfer a common voltage Vcom generated from the common voltage supply unit to the plurality of touch electrodes TE11 to TE14, TE21 to TE24, and TE31 to TE34 in the display mode and a touch drive signal generated from the touch circuit 150 and the switch circuit 160 to the plurality of touch electrodes TE11 to TE14, TE21 to TE24, and TE31 to TE34 in the touch mode. The structure and formation of subpixels and use of pixel electrodes 410 are well known in the art and thus are not discussed herein to save space. Any known method to form the subpixels is acceptable.

One electrode 416 functioning as a common electrode and a touch electrode is formed on the second protective layer 414, and a liquid crystal layer 418 is formed thereon. Herein, the electrode 416 functioning as the common electrode and the touch electrode is one of the conductive lines in plurality of touch electrodes TE11 to TE14, TE21 to TE24, and TE31 to TE34 and may be a block-shaped pattern, as shown in FIG. 3.

An upper substrate 420 on which a black matrix 419a, a color filter 419b, and the like, are to be formed is positioned on the liquid crystal layer 418.

Although FIG. 4 illustrates the liquid crystal display device, one embodiment of the present invention is not limited thereto and can be applied to various display devices which can be integrated with a touch panel.

Figure 5:
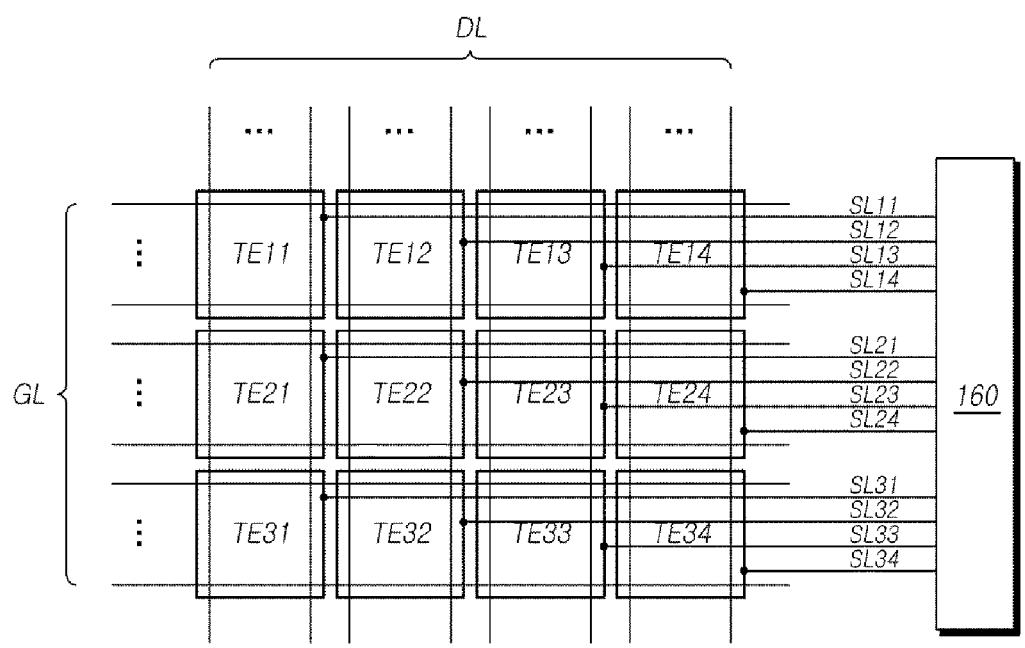
FIG. 5 is another plane view illustrating the display panel included in the touch screen-integrated display device according to the present invention.

FIG. 5 is another plane view illustrating the display panel of the touch screen-integrated display device 100 according to one embodiment of the present invention.

Referring to FIG. 5, unlike in FIG. 3, the sensing lines SL11 to SL14, SL21 to SL24 and SL31 to SL34 which are respectively connected to the plurality of touch electrodes TE11 to TE14, TE21 to TE24, and TE31 to TE34 to transfer a touch drive signal or a common voltage may be disposed in parallel with the second direction (for example, horizontal direction) in which the gate lines GL are disposed.

In this case, the touch drive signal generated from the touch circuit 150 and the switch circuit 160 illustrated in FIG. 1 or the common voltage generated or supplied from the common voltage supply unit may be transferred to all or parts of the plurality of touch electrodes TE11 to TE14, TE21 to TE24, and TE31 to TE34 through the sensing lines SL11 to SL14, SL21 to SL24 and SL31 to SL34 disposed in parallel with the gate lines.

The touch sensing lines may be formed in a conductive metal layer M3L (or third conductive layer) during the process. However, in other embodiments, a plurality of touch sensing lines can be parallel with a plurality of the data lines.

Examples of a thin-film transistor formed on a back plane to which one embodiment of the present invention can be applied may include amorphous silicon (hereinafter, referred to as "a-Si"), metal oxide, and poly silicon. The poly silicon may be low temperature poly silicon (hereinafter, referred to as "LTPS") and high temperature poly silicon (hereinafter, referred to as "HIPS"), but is not limited thereto.

Further, in the present specification, a pixel electrode and a common electrode of each subpixel have been mainly described. However, if the present invention is used in a touch screen-integrated display device, the common electrode may refer to a common electrode of each corresponding subpixel within a touch electrode. If the present invention is used in an IPS mode liquid crystal display device, the common electrode may refer to a pixel electrode and a common electrode disposed in each subpixel.

That is, the present invention can be applied to any display device in which a subpixel is defined and a pixel electrode and a common electrode are present within the subpixel.

Figure 6A:
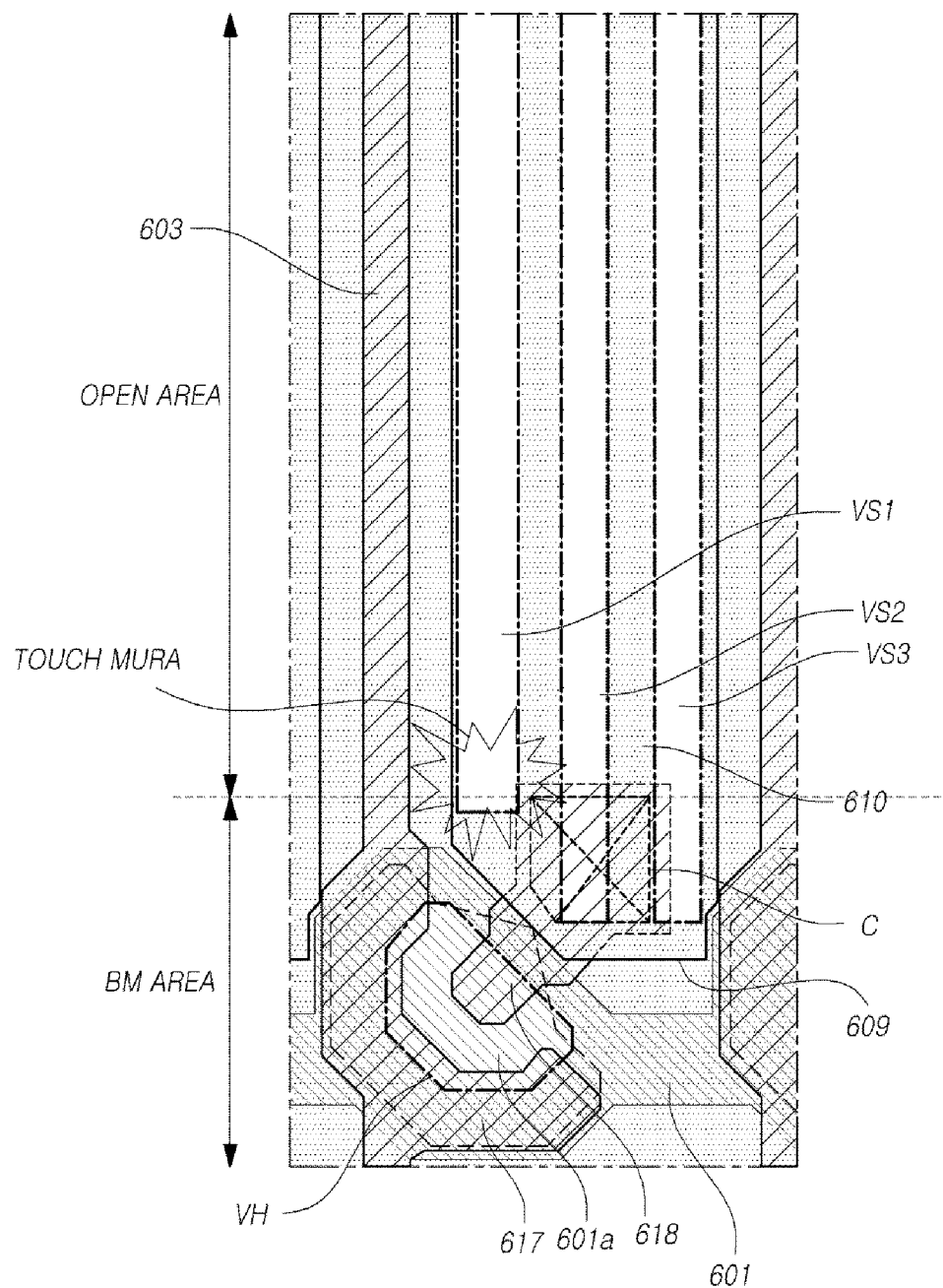
FIG. 6A and FIG. 6B are diagrams illustrating occurrence of a touch mura and a decrease in transmittance in a subpixel of a display device.
Figure 6B:
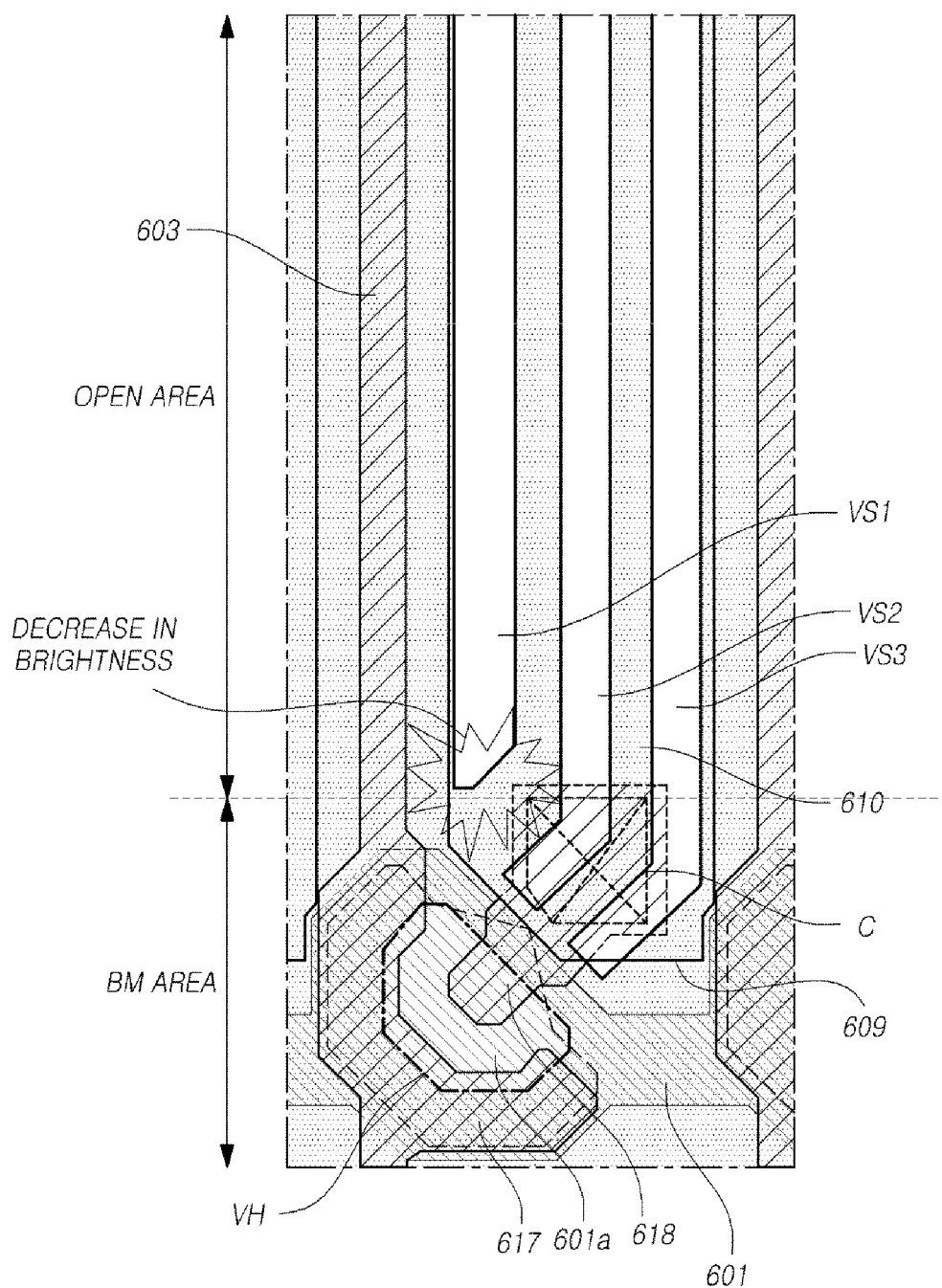

FIG. 6A and FIG. 6B are diagrams illustrating occurrence of a touch mura and a decrease in transmittance in a subpixel of a display device. The term "mura" is used herein has the meaning of an unevenness, irregularity, or lack of uniformity. It is derived from the Japanese word "mura" that is widely used in mechanical assemblies having similar meaning as used herein.

Referring to FIG. 6A and FIG. 6B, in the display device, subpixels SP are defined by a plurality of gate lines 601 and data lines 603 disposed alternately. A thin-film transistor TFT is disposed at an intersection between the gate line 601 and the data line 603. In each subpixel area SP, a pixel electrode 609 and a common electrode 610 are disposed with an insulation layer (for example, protective layer or passivation layer) interposed therebetween. Further, the thin-film transistor TFT includes a gate electrode 601a, a gate insulation layer (not shown), an active layer (not shown), a source electrode 617, and a drain electrode 618.

In case of a touch screen-integrated display device, the common electrode 610 may be a touch electrode TE. If the common electrode 610 is a touch electrode, the touch electrode may be formed into a block shape so as to correspond to a plurality of subpixels.

The common electrode 610 includes slit patterns in an area corresponding to each subpixel SP. Common electrode spaces VS (Vcom space) are present between the slit patterns. In the drawing, first to third common electrode spaces VS1, VS2, and VS3 in the common electrode respectively corresponding to the subpixels SP are formed, but the number of common electrode spaces is not limited thereto.

Further, each subpixel SP is divided into an open area where an image is displayed and a black matrix area (hereinafter, referred to as "BM area") as a non-active area. In the BM area, a thin-film transistor, the gate line 601, and the data line 603 are disposed. In case of a liquid crystal display device, the BM area refers to a black matrix formed on a color filter substrate.

In a subpixel structure illustrated in FIG. 6A, the first to third common electrode spaces VS1, VS2, and VS3 formed on the common electrode 610 are disposed in a direction parallel with the data line 603. Thus, a rubbing direction of an alignment film is similar to the angle of the common electrode 610.

Therefore, if liquid crystals are applied with an external pressure, the force is the highest at an angle of 45° between the common electrode 610 and the rubbing direction according to the principle of Equation 1. Therefore, in the electrode structure illustrated in FIG. 6A, it takes a long time to restore the liquid crystals to a normal alignment state.

Accordingly, a defect such as a white touch mura occurs in the subpixel.

$$|T| = \frac{\partial W_E}{\partial \theta} = \Delta\varepsilon \cdot \sin 2\theta \cdot E^2 \qquad \text{Equation (1)}$$

(T represents a torque of liquid crystals, ε represents a dielectric constant of liquid crystals, θ represents an angle of an electrode, and E represents an electric field applied to liquid crystals.)

That is, since an angle between the electrode and a rubbing direction in the first common electrode space VS1 of the common electrode 610 is small, a disclination area where it takes a long time to restore liquid crystals if an external pressure is applied is generated. Thus, a white touch mura occurs.

As such, in order to suppress occurrence of a white touch mura, there has been suggested a structure in which edges of the first to third common electrode spaces VS1, VS2, and VS3 of the common electrode 610 are bent toward the inside of the BM area, as illustrated in FIG. 6B.

However, a common electrode hole VH is formed at an upper part of the thin-film transistor in order to reduce a parasitic capacitance between the thin-film transistor and the common electrode 610. Thus, there is a limitation on the lengths of the first to third common electrode spaces VS1, VS2, and VS3 to be bent toward the inside of the BM area.

Due to such a design limitation, an edge of the first common electrode space VS1 formed on the common electrode 610 is located in the open area, which causes a decrease in transmittance (decrease in brightness) within the subpixel.

Therefore, in the display device according to one embodiment of the present invention, patterns (concavo-convex patterns) having a plurality of pixel electrode spaces are formed on a pixel electrode area disposed in a subpixel so as to suppress a white touch mura defect and also suppress a decrease in transmittance occurring at an interface between the open area and the BM area.

Particularly, an angle between a liquid crystal alignment direction and a pixel electrode is increased by the pixel electrode spaces formed on the pixel electrode area, so that a restoration force of liquid crystals is increased according to Equation 1. Thus, occurrence of a white touch mura defect caused by an external pressure such as a touch can be suppressed.

Figure 7:
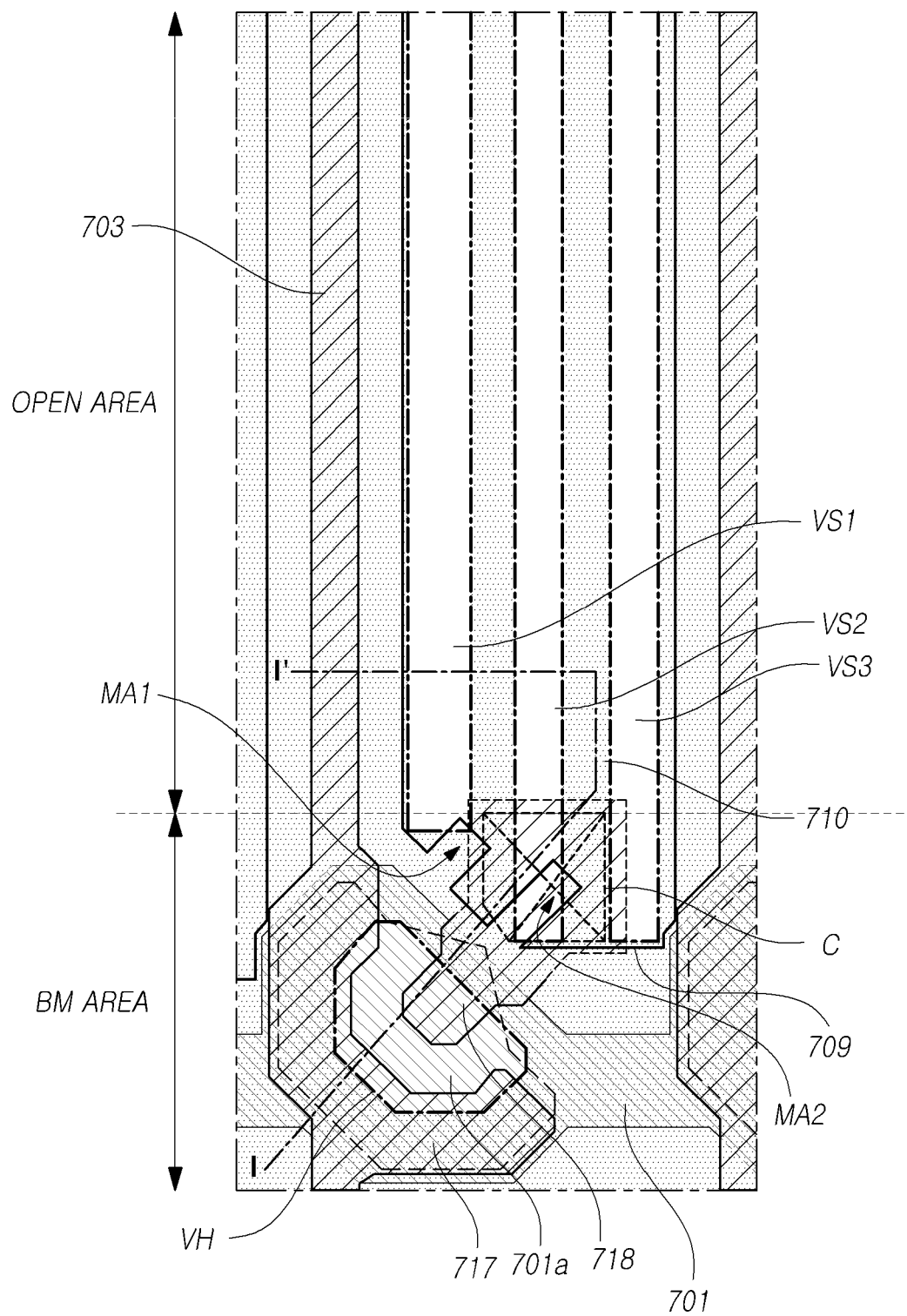
FIG. 7 is a diagram illustrating an electrode structure in a subpixel of a display device according to one embodiment of the present invention.
Figure 8:
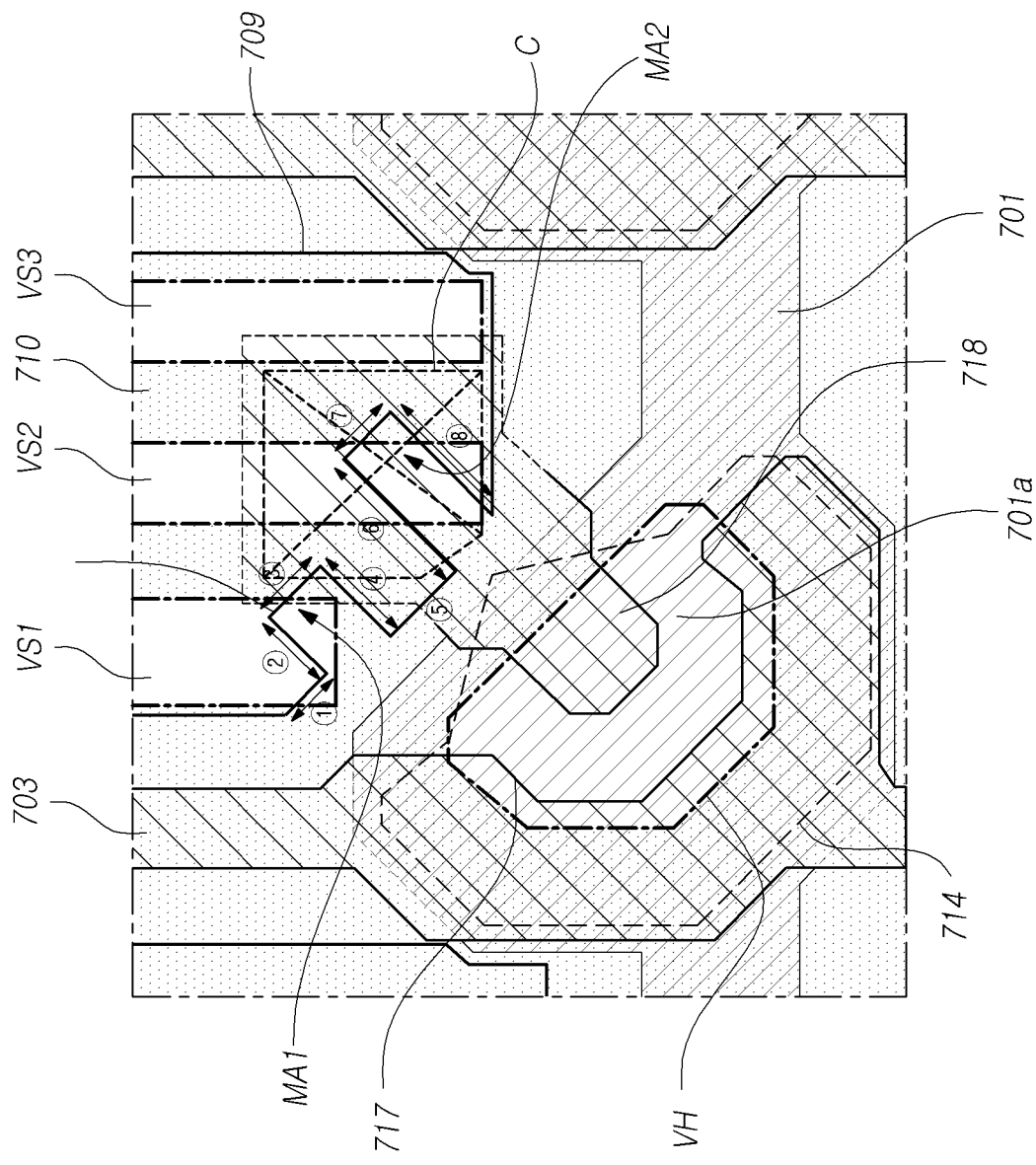
FIG. 8 is an enlarged view of a thin-film transistor area in a subpixel of the display device according to one embodiment of the present invention.
Figure 9:
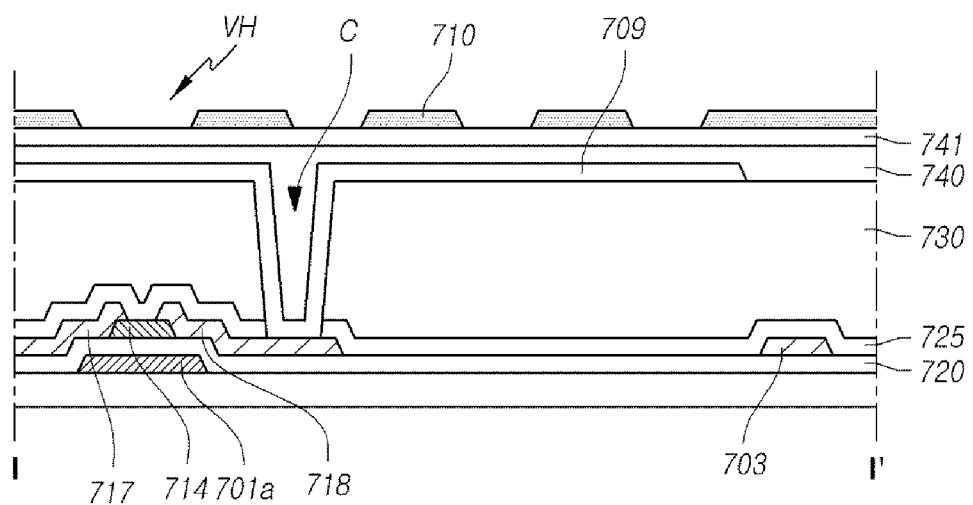
FIG. 9 is a cross-sectional view taken along a line I-I' of FIG. 7.

FIG. 7 is a diagram illustrating an electrode structure in a subpixel of a display device according to one embodiment of the present invention, FIG. 8 is an enlarged view of a thin-film transistor area in a subpixel of the display device according to one embodiment of the present invention, and FIG. 9 is a cross-sectional view taken along a line I-I' of FIG. 7.

Referring to FIG. 7 through FIG. 9, the display device according to one embodiment of the present invention includes a plurality of gate lines 701 disposed in a first direction (horizontal direction or direction intersecting with a second direction), a plurality of data lines 703 disposed in the second direction (vertical direction or direction intersecting with the first direction) and configured to define subpixels SP by intersecting with the gate lines 701, a thin-film transistor TFT disposed at an intersection between the gate line 701 and the data line 703, a pixel electrode 709 disposed in the subpixel area, and a common electrode 710 disposed to be overlapped with the pixel electrode 709 with an insulation layer (protective layers) interposed therebetween.

As described above, if the display device used for the present invention is a touch screen-integrated display device, the common electrode 710 may be a part of a touch electrode TE corresponding to a group of a plurality of subpixels.

Further, the thin-film transistor TFT includes a gate electrode 701a, agate insulation layer 720 (not shown), an active layer 714 (not shown), a source electrode 717, and a drain electrode 718.

Particularly, the common electrode 610 disposed in the subpixel area SP includes a plurality of slit patterns, and a plurality of common electrode spaces VS1, VS2, and VS3 are present between the slit patterns.

Further, the pixel electrode 709 located in the BM area of the subpixel includes patterns including a plurality of pixel electrode spaces MA1 and MA2. Thus, a restoration force of liquid crystals against an external pressure is increased.

Therefore, the liquid crystals are rapidly restored to an original alignment direction so as to suppress a defect such as a white touch mura (a mura in an area applied to a display device with an external pressure such as a touch).

Referring to FIG. 8, the patterns formed on the pixel electrode 709 include a first pixel electrode space MA1 and a second pixel electrode space MA2. The first pixel electrode space MA1 is adjacent to the data line 703, and the second pixel electrode space MA2 is farther from the data line 703 than the first pixel electrode space MA1. Since the number of pixel electrode spaces is not limited thereto, three or more pixel electrode spaces may be present in some cases.

Further, a length of the first pixel electrode space MA1 is shorter than a length of the second pixel electrode space MA2. The first pixel electrode space MA1 forms an angle of 45° with the first common electrode space VS1 of the common electrode 710.

The second pixel electrode space MA2 forms an angle of 45° with the second common electrode space VS2 of the common electrode 710. Further, the first to third common electrode spaces VS1, VS2, and VS3 formed on the common electrode 710 are disposed in parallel with the data line 703.

Therefore, in the area where the first and second pixel electrode spaces MA1 and MA2 of the pixel electrode 709 are present, there is an area where the pixel electrode 709 and the common electrode 710 form an angle of 45° with each other.

More specifically, assuming that patterned surfaces of the pixel electrode 709 formed by the first and second pixel electrode spaces MA1 and MA2 are referred to as ①, ②, ③, ④, ⑤, ⑥, ⑦, and ⑧, the surfaces ①, ②, ③, and ④ corresponding to the first pixel electrode space MA1 are formed as small as practical by using a process minimum value as permitted bt processes then in use for these lines. These surfaces are formed to have a length of about 2.5 μm in one embodiment, but could be smaller.

Meanwhile, a length of the surfaces ⑥ and ⑧ of the surfaces ⑤, ⑥, ⑦, and ⑧ formed by the second pixel electrode space MA2, i.e., a length of the second pixel electrode space MA2, is set to about 7 μm in one embodiment.

This is to improve a restoration force of liquid crystals by setting an angle between the pixel electrode 709 and the liquid crystal alignment direction to 45° and thus maximizing a torque of liquid crystals according to Equation 1. This is also to suppress a decrease in brightness caused by a decrease in transmittance by adjusting the lengths of the first and second pixel electrode spaces MA1 and MA2.

Therefore, in the display device when an external pressure such as a touch is applied, the liquid crystals are rapidly restored by the restoration force of liquid crystals. Thus, a defect such as a white touch mura generated by a touch is suppressed.

Further, in one embodiment of the present invention, multiple angles such as the first and second pixel electrode spaces MA1 and MA2 are formed on the pixel electrode, so that the common electrode spaces VS1, VS2, and VS3 of the common electrode can be disposed in parallel with the data line 703 and the edges thereof can be located within the BM area. Thus, a decrease in brightness occurring in the subpixel can be suppressed.

Referring to FIG. 9, in the display device of one embodiment of the present invention, the thin-film transistor TFT including the gate electrode 701a, the gate insulation layer 720, the active layer 714, the source electrode 717, and the drain electrode 718 is disposed on a substrate 700. The data line 703 is disposed on the same layer as the source electrode 717 and the drain electrode 718.

A first protective layer 725 is disposed on the thin-film transistor TFT and the data line 703, and a flattening layer 730 is disposed on the first protective layer 725. The first protective layer 725 may not be formed if necessary.

The pixel electrode 709 is disposed on the flattening layer 730, and electrically connected to the drain electrode 718 of the thin-film transistor TFT through a contact hole C.

Further, second and third protective layers 740 and 741 are laminated and disposed on the pixel electrode 709, and the common electrode 710 is disposed on the third protective layer 741. In an area of the common electrode 710 overlapped with the thin-film transistor TFT, a common electrode hole VH is formed so as to minimize a parasitic capacitance between the common electrode 710 and the thin-film transistor TFT.

The first to third protective layers 725, 740, and 741 may be formed of electrical insulation layers, and any one of the second and third protective layers 740 and 741 may not be formed.

if the display device is a touch screen-integrated display device, the common electrode 710 may be a part of a touch electrode and a touch sensing line electrically connected to the touch electrode may be further formed. The touch sensing line is electrically connected to the common electrode 710 or the touch electrode (refer to FIGS. 3 and 5). However, in other embodiments, a plurality of touch sensing lines can be parallel with a plurality of the data lines.

Figure 10A:
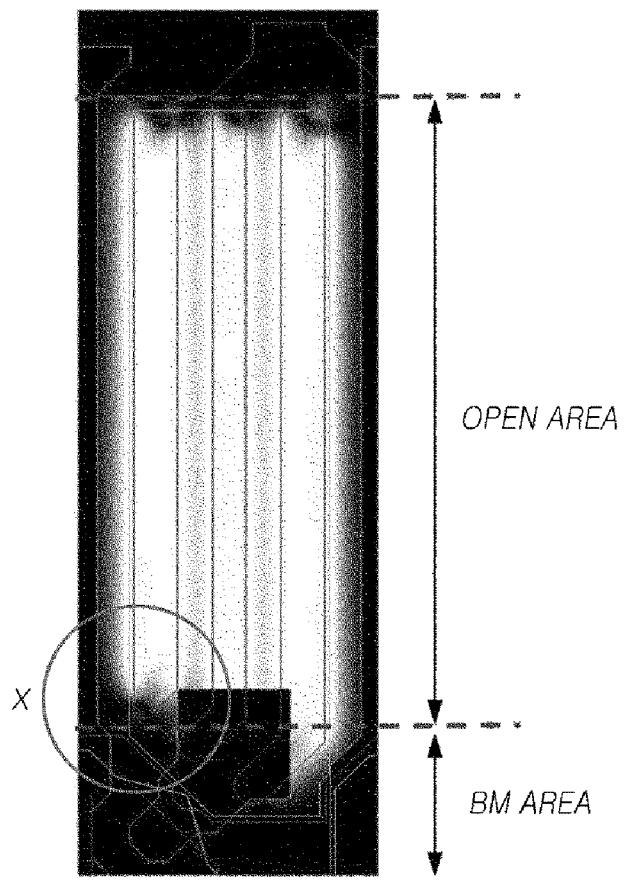
FIG. 10A and FIG. 10B are diagrams illustrating an improvement in transmittance in a subpixel of the display device according to one embodiment of the present invention.
Figure 10B:
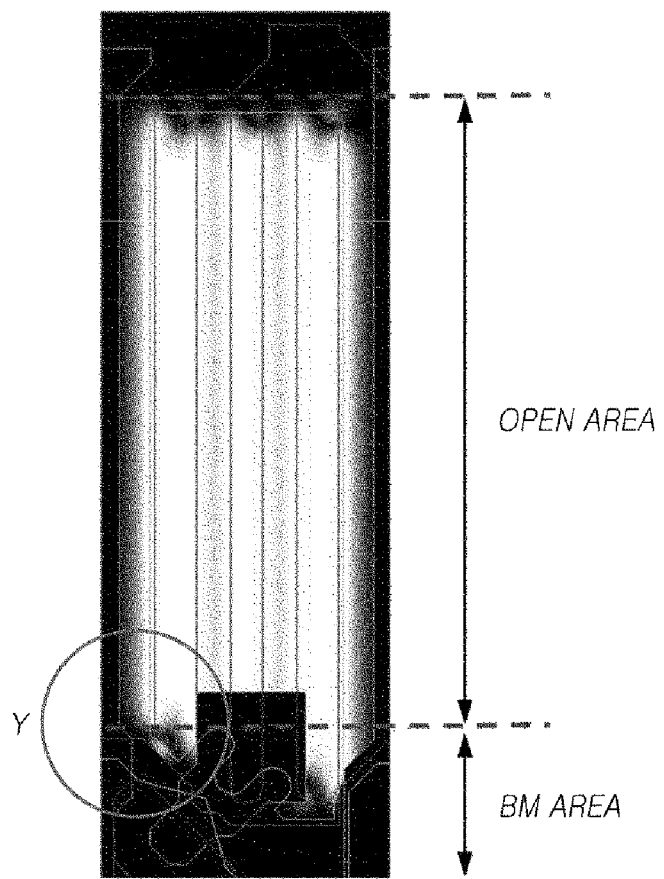

FIG. 10A and FIG. 10B are diagrams illustrating an improvement in transmittance in a subpixel of the display device according to one embodiment of the present invention.

Referring to FIG. 10A, if a part of the common electrode 610 disposed in the BM area of the subpixel SP is bent as illustrated in FIG. 6B, the second and third common electrode spaces VS2 and VS3 have predetermined angles, respectively.

However, a distance margin with respect to the common electrode hole VH formed in the common electrode 610 to reduce a parasitic capacitance needs to be left. Thus, a part of the edge of the first common electrode space VS1 is located in the open area.

Therefore, as illustrated in FIG. 10A, a decrease in brightness caused by a decrease in transmittance occurs in an area X between the open area and the BM area.

However, if multiple angles are formed on the pixel electrode 709 by the first pixel electrode space MA1 and the second pixel electrode space MA2, as described in FIG. 7, a lower side (edge area) of the first common electrode space VS1 formed on the common electrode 710 may be located in the BM area (non-active area) (so as to be in parallel with the data line). Thus, it is possible to suppress a decrease in brightness caused by a decrease in transmittance in an area Y illustrated in FIG. 10B.

Further, as described with reference to FIG. 8, since a restoration force of liquid crystals is maximized by the first and second pixel electrode spaces MA1 and MA2 formed on the pixel electrode 709, it is possible to suppress a white touch mura defect caused by an external pressure such as a touch.

Accordingly, in a subpixel structure of a display device and a touch screen-integrated display device having the subpixel structure according to one embodiment of the present invention, patterns (concavo-convex patterns) having a plurality of pixel electrode spaces are formed on a pixel electrode area disposed in a subpixel so as to suppress a white touch mura defect and also suppress a decrease in transmittance occurring at an interface between an open area and a BM area.

The foregoing description and the accompanying drawings are provided only to illustrate the technical conception of the present disclosure, but it will be understood by a person having ordinary skill in the art that various modifications and changes such as combinations, separations, substitutions, and alterations of the components may be made without departing from the scope of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A touch-screen display device, comprising:
a plurality of gate lines disposed in a first direction;
a plurality of data lines disposed in a second direction and configured to define subpixels by intersecting with the gate lines;
a thin-film transistor disposed at an intersection of the gate line and the data line;
a plurality of touch sensing lines parallel with the plurality of the data lines;
a pixel electrode disposed in a subpixel area of one of the subpixels, the pixel electrode including a first pixel electrode space extending laterally inward into the pixel electrode and a second pixel electrode space extending laterally inward into the pixel electrode, the first and second pixel electrode spaces located in a black matrix area of the subpixel area; and
a common electrode disposed in the subpixel area and overlying the pixel electrode, the
common electrode having a slit structure including at least one common electrode space, wherein a length of the first pixel electrode space is shorter than a length of the second pixel electrode space.

2. The touch-screen display device according to claim 1, wherein the at least one common electrode space forms an angle with the at least one first electrode space.

3. The touch-screen display device according to claim 1, wherein the at least one pixel electrode space forms an angle with one of the plurality of the data lines, and the slit structure of the common electrode is parallel with one of the plurality of data lines.

4. The touch-screen display device according to claim 1, wherein the at least one pixel electrode space is overlapped with a source electrode or a drain electrode of the thin film transistor.

5. The touch-screen display device according to claim 1, wherein the slit structure of the common electrode is parallel with one of the data lines and an edge portion of the common electrode is located in the black matrix area.

6. The touch-screen display device according to claim 1, further comprising a touch electrode corresponding to a plurality of the subpixels.

7. The touch-screen display device according to claim 6, wherein the touch electrode is a part of the common electrode and connected to one of the plurality of touch sensing lines.

8. The touch-screen display device according to claim 1, further comprising, a common electrode hole overlapped with a portion of the thin-film transistor.

9. The touch-screen display device according to claim 8, wherein the common electrode hole is formed so as to minimize a parasitic capacitance between the common electrode and the thin-film transistor.

10. A touch screen-integrated display device comprising:
a plurality of gate lines disposed in a first direction;
a plurality of data lines disposed in a second direction and configured to define subpixels by intersecting with the gate lines;

a thin-film transistor disposed at an intersection of the gate line and the data line;

a plurality of touch sensing lines parallel with the plurality of the data lines;

a pixel electrode disposed in a subpixel area of one of the subpixels;

a common electrode overlying the pixel electrode, and a touch electrode disposed in the subpixel area, wherein the common electrode has a slit structure including at least one common electrode space and the pixel electrode has patterns including at least one pixel electrode space, and wherein the patterns of the pixel electrode are located in a black matrix area, and wherein the at least one common electrode space overlaps with the at least one pixel electrode space in the black matrix area.

11. The touch screen-integrated display device according to claim 10, wherein the at least one common electrode space forms an angle with the at least one pixel electrode space.

12. The touch screen-integrated display device according to claim 10, wherein the at least one pixel electrode space forms an angle with one of the plurality of the data lines, and the slit structure of the common electrode is parallel with one of the plurality of data lines.

13. The touch screen-integrated display device according to claim 12, wherein the at least one pixel electrode space includes a first pixel electrode space and a second pixel electrode space, a length of the first pixel electrode space is shorter than a length of the second pixel electrode space.

14. The touch screen-integrated display device according to claim 10, wherein the at least one pixel electrode space of the pixel electrode is overlapped with a source electrode or a drain electrode of the thin film transistor.

15. The touch screen-integrated display device according to claim 10, wherein the slit structure of the common electrode is parallel with the data line and an edge portion of the common electrode is located in the black matrix area.

16. The touch screen-integrated display device according to claim 10, wherein the touch electrode is a part of the common electrode and connected to one of the plurality of sensing lines.

17. The touch screen-integrated display device according to claim 10, further comprising, a common electrode hole overlapped with a portion of the thin-film transistor.

18. The touch screen-integrated display device according to claim 17, wherein the common electrode hole is formed so as to minimize a parasitic capacitance between the common electrode and the thin-film transistor.

19. The touch screen-integrated display device according to claim 10, wherein the patterns of the pixel electrode are parallel with a drain electrode of the thin-film transistor.

20. The touch-screen display device according to claim 1, wherein the at least one pixel electrode space includes a first pixel electrode space adjacent to the data line, and a second pixel electrode space farther from the data line than the first pixel electrode space.

21. The touch-screen display device according to claim 1, wherein the at least one pixel electrode space and the at least one common electrode space form an angle of 45 degree with each other in the area of the pixel electrode space.

* * * * *